United States Patent
Chlapik et al.

(10) Patent No.: US 10,246,326 B2
(45) Date of Patent: Apr. 2, 2019

(54) STEAM REFORMING

(71) Applicant: JOHNSON MATTHEY PUBLIC LIMITED COMPANY, London (GB)

(72) Inventors: Kenneth Chlapik, LaGrange Park, IL (US); Peter William Farnell, North Yorkshire (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/117,624

(22) PCT Filed: Feb. 17, 2015

(86) PCT No.: PCT/GB2015/050447
§ 371 (c)(1),
(2) Date: Aug. 9, 2016

(87) PCT Pub. No.: WO2015/132555
PCT Pub. Date: Sep. 11, 2015

(65) Prior Publication Data
US 2016/0347613 A1    Dec. 1, 2016

(30) Foreign Application Priority Data

Mar. 4, 2014  (GB) .................................. 1403787.3

(51) Int. Cl.
*B01J 8/06* (2006.01)
*C01B 3/38* (2006.01)
(Continued)

(52) U.S. Cl.
CPC ................ *C01B 3/40* (2013.01); *B01J 8/062* (2013.01); *B01J 8/067* (2013.01); *B01J 19/32* (2013.01);
(Continued)

(58) Field of Classification Search
CPC ..... C01B 2203/1011; C01B 2203/1058; C01B 2203/0811; C01B 2203/1047;
(Continued)

(56) References Cited

U.S. PATENT DOCUMENTS 7,566,487 B2   7/2009  Feinstein
7,761,994 B2   7/2010  Repasky et al.
(Continued)

FOREIGN PATENT DOCUMENTS

DE        3744265 A1    7/1989
EP      0 843 590 B1    8/1999
(Continued)

OTHER PUBLICATIONS

International Search Report, dated Aug. 19, 2015, from corresponding PCT Application.

*Primary Examiner* — Amber R Orlando
*Assistant Examiner* — Syed T Iqbal
(74) *Attorney, Agent, or Firm* — Baker & Hostetler LLP

(57) ABSTRACT

An apparatus for steam reforming of hydrocarbons is described including a steam reformer containing a plurality of externally-heated vertical tubes each tube having an inlet for a feed gas mixture including hydrocarbon and steam, and an outlet for a reformed gas mixture, wherein the tubes contain a particulate steam reforming catalyst adjacent the outlet and a structured steam reforming catalyst adjacent the inlet. A process for steam reforming of hydrocarbons using the apparatus is also described.

18 Claims, 2 Drawing Sheets

(51) Int. Cl.
*C01B 3/40* (2006.01)
*B01J 19/32* (2006.01)

(52) U.S. Cl.
CPC ............. *B01J 19/325* (2013.01); *C01B 3/382* (2013.01); *B01J 2208/00168* (2013.01); *B01J 2208/00221* (2013.01); *B01J 2208/00504* (2013.01); *B01J 2208/00814* (2013.01); *B01J 2208/065* (2013.01); *B01J 2219/3221* (2013.01); *B01J 2219/32237* (2013.01); *B01J 2219/32241* (2013.01); *B01J 2219/32244* (2013.01); *B01J 2219/32272* (2013.01); *B01J 2219/32279* (2013.01); *B01J 2219/32296* (2013.01); *B01J 2219/32408* (2013.01); *B01J 2219/32466* (2013.01); *C01B 2203/0233* (2013.01); *C01B 2203/0811* (2013.01); *C01B 2203/1005* (2013.01); *C01B 2203/1011* (2013.01); *C01B 2203/1047* (2013.01); *C01B 2203/1058* (2013.01); *C01B 2203/1082* (2013.01); *C01B 2203/1241* (2013.01); *C01B 2203/141* (2013.01); *C01B 2203/169* (2013.01)

(58) Field of Classification Search
CPC .............. C01B 2203/141; C01B 3/382; C01B 2203/1005; C01B 3/40; C01B 2203/1241; C01B 2203/169; C01B 2203/0233; C01B 2203/1082; B01J 2219/32244; B01J 2219/3221; B01J 2208/00504; B01J 2219/32466; B01J 2219/32279; B01J 2208/00168; B01J 2208/00221; B01J 19/325; B01J 8/062; B01J 2219/32296; B01J 2208/065; B01J 19/32; B01J 8/067; B01J 2219/32237; B01J 2219/32272; B01J 2208/00814; B01J 2219/32241; B01J 2219/32408

See application file for complete search history.

(56) References Cited

U.S. PATENT DOCUMENTS

| | | | |
|---|---|---|---|
| 7,871,579 | B2 | 1/2011 | Tentarelli |
| 7,906,079 | B2 | 3/2011 | Whittenberger et al. |
| 7,976,783 | B2 | 7/2011 | Feinstein |
| 8,178,075 | B2 | 5/2012 | He et al. |
| 8,235,261 | B1 | 8/2012 | Feinstein |
| 8,235,361 | B2 | 8/2012 | Feinstein |
| 8,257,658 | B2 | 9/2012 | Feinstein |
| 2005/0142049 | A1 | 6/2005 | Amsden et al. |
| 2007/0299148 | A1* | 12/2007 | Verbist .............. B01J 8/067 518/712 |
| 2008/0131361 | A1* | 6/2008 | Garg ................. B01J 8/062 423/653 |
| 2011/0194991 | A1 | 8/2011 | Jin et al. |
| 2012/0195801 | A1 | 8/2012 | Whittenberger |
| 2012/0277331 | A1 | 11/2012 | Gamlin et al. |
| 2012/0288420 | A1 | 11/2012 | Feinstein |
| 2012/0294779 | A1 | 11/2012 | Feinstein |
| 2013/0287652 | A1 | 10/2013 | Lehr et al. |

FOREIGN PATENT DOCUMENTS

| | | |
|---|---|---|
| EP | 1 930 293 A1 | 6/2008 |
| EP | 2 514 523 A1 | 10/2012 |
| GB | 472629 A1 | 9/1937 |
| RU | 113729 U1 | 2/2012 |
| WO | 2006/051098 A1 | 5/2006 |
| WO | 2010/029323 A1 | 3/2010 |
| WO | 2010/029324 A1 | 3/2010 |
| WO | 2011/048361 A1 | 4/2011 |
| WO | 2012/138218 A1 | 10/2012 |
| WO | 2012/146904 A1 | 11/2012 |
| WO | 2015107322 A1 | 7/2015 |

\* cited by examiner

STEAM REFORMING

This invention relates to a process of steam reforming hydrocarbons to produce a synthesis gas and to apparatus for carrying out the process.

Synthesis gas comprises hydrogen and carbon oxides (carbon monoxide and carbon dioxide) and may contain nitrogen and other gases such as argon and low levels of methane. The synthesis gas may contain greater or lesser amounts of hydrogen and carbon oxides suited to the particular end use, such as hydrogen manufacture for refineries or fuel cells, ammonia synthesis, methanol synthesis, dimethylether synthesis or the Fischer-Tropsch process for the synthesis of liquid hydrocarbons. Synthesis gas is often produced by a steam reforming process.

In a steam reforming process, a mixture of a hydrocarbon feedstock and steam, and in some cases also carbon dioxide or other components, is passed at an elevated pressure through particulate catalyst-filled heat exchange tubes, which are externally heated by means of a suitable heating medium, generally a hot gas mixture. The catalyst is normally in the form of shaped units, e.g. cylinders having a plurality of through holes, and is typically formed from a refractory support material e.g. alumina, impregnated with a suitable catalytically active metal such as nickel. Such particulate catalysts have been used successfully for many years in steam reforming as they are able to withstand the stresses imposed upon then from the weight of the catalyst within the tube in addition to the imposed pressure drop load at high temperature and do not exhibit breakage unless subject to mal-operation.

Structured steam reforming catalysts offer higher heat transfer, higher activity and lower pressure drop than particulate steam reforming catalysts. Therefore, there have been proposals to use them throughout the entire depth of the tube to maximise the performance of the steam reformer in terms of obtaining the lowest tube wall temperature, the lowest pressure drop and the maximum hydrocarbon conversion. Structured steam reforming catalysts however are typically manufactured from metals, typically high temperature alloys. The strength of these materials reduces substantially at the temperatures encountered at the outlet of steam reformers. Therefore, as the structured catalyst is often formed from leaves of very thin material with little weight bearing capability, it is often mounted on a central core structure that supports all of the weight of the catalyst along with the imposed pressure drop load.

Alternatively, in structured catalysts based on catalyst containers, the container walls are made thick enough to create a self-supporting structure. In most steam reformers, the process gas flows downwards in the tubes, meaning that the load on the catalyst increases to a maximum at the bottom of the tube, which has to withstand the total catalyst weight plus the total pressure drop load. This is also the point of maximum temperature and lowest metal strength. This problem is further compounded by the fact that metals undergo creep deformation at high temperature and this deformation may result in the closing off of flow passages, resulting in an even higher pressure drop or loss of flow over the catalytic surfaces. Finally, the costs of structured steam reforming catalysts are often higher than particulate steam reforming catalyst. In order to obtain a structured steam reforming catalyst capable of operating at the high outlet temperature requires an increased amount of support structure or thicker catalyst containers to withstand the high loads at high temperature. This makes the catalyst cost for the outlet of the reformer disproportionately high.

In steam reforming, it is known that the catalyst in the inlet section of the tube operates under the more severe conditions due to a range of different effects. We have recognised that a catalyst system using a high performance structured catalyst in the inlet section of the tube to maximise performance and catalyst lifetime under the harder demands at that location, along with a particulate catalyst in the outlet to utilise the greater high temperature strength, without compromising the reformer performance or catalyst lifetime due to the lower duty at the outlet zone, offers significant benefits.

Accordingly the invention provides an apparatus for steam reforming of hydrocarbons comprising a steam reformer containing a plurality of externally-heated vertical tubes each tube having an inlet for a feed gas mixture comprising hydrocarbon and steam, and an outlet for a reformed gas mixture, wherein the tubes contain a particulate steam reforming catalyst adjacent the outlet and a structured steam reforming catalyst adjacent the inlet.

The invention further provides a process for steam reforming of hydrocarbons to generate a reformed gas mixture using the apparatus.

By "structured steam reforming catalyst" we mean a steam reforming catalyst supported on or contained within a structure, typically a fabricated metal or ceramic structure.

We have found that structured catalysts offer heat transfer benefits and extra activity, which is more effective in the inlet zone of the steam reformer. However, in the outlet zone of the steam reformers where the duty is lower, the structured catalyst may be replaced with a conventional particulate catalyst to provide the desired conversion at an overall lower cost than if structured catalysts were used along the entire length of the tubes. Another key benefit of the present arrangement is that it overcomes the need for extensive support structures often required for structured catalysts, in particular at the at the bottom of the tubes due to high temperature, total weight and pressure drop. Furthermore loading and unloading of the structured catalyst may be shortened and the flexibility to provide tailored reforming solutions improved. Therefore, using structured catalyst at the inlet of the tubes and particulate catalyst at the outlet of the tubes offers a more cost effective and more robust catalyst arrangement than particulate catalyst alone, structured catalyst alone or alternative arrangements of particulate catalyst and structured catalyst.

The steam reformer contains a plurality of vertical tubes through which the gas mixture may be passed, and to which heat is transferred by means of a hot gas flowing around the tubes. The tube inlets are typically at the top end such that the feed gas mixture is typically fed to the top of the steam reformer and flows downward through the tubes. The steam reforming reactions are endothermic and heat is transferred to the tubes by means of a hot gas flowing around the exterior surfaces of the tubes.

Thus the invention includes apparatus for steam reforming of hydrocarbons comprising a steam reformer having an inlet for a gas mixture comprising hydrocarbon and steam, an outlet for a reformed gas mixture, and a plurality of vertical tubes in communication with the inlet through which the gas mixture may be passed, and to which heat is transferred by means of a hot gas flowing around the tubes in a heat exchange zone, wherein the tubes contain a particulate steam reforming catalyst in the heat exchange zone adjacent the outlet and a structured steam reforming catalyst in the heat exchange zone adjacent the inlet.

Various steam reformer arrangements may be used. Thus the steam reformer may be a conventional top-fired steam reformer or a side-fired steam reformer. In such reformers the hot gas is provided by combusting a fuel gas using a plurality of burners disposed either at the top end or along the length of the tubes. Alternatively, the steam reformer may be a gas-heated reformer (GHR) in which the hot gas may be provided by a flue-gas from a combustion process, or may be a gas generated by catalytic or non-catalytic partial oxidation of a hydrocarbon, or by autothermal reforming of a hydrocarbon and/or the reformed gas mixture. Furthermore the hot gas may be mixed with the reformed gas that has passed through the plurality of tubes.

In top-fired or side-fired reformers, the burners are typically fed with a fuel gas mixture comprising a hydrocarbon, such as methane, and which may further comprise hydrogen or other suitable fuel gases. Combustion is performed using an oxidant such as air, which is also fed to the one or more burners to form the hot combustion gas. In the case of a top-fired reformer the inlets for the feed gas mixture are typically located at the top end of the reformer and the outlets for the reformed gas mixture at the bottom end. The burners are located at the top end and the combusted gas outlet is typically located at the bottom end. In the case of a side-fired reformer the inlets for the feed gas mixture are typically located at the top end of the reformer and the outlets for the reformed gas mixture at the bottom end. The burners in this case are located at multiple levels between the top end and the bottom end and the combusted gas outlet is typically located at the top end. The feed gas mixture may be passed to distribution means, such as header pipes which distribute the feed gas mixture to the heat exchange tubes. The tubes pass through a heat exchange zone in which heat is transferred to the reactants passing through the tubes. Collector pipes may be connected to the bottom of the tubes, which provide channels for collection of the reformed gas. Such distribution and collection means define an inlet zone and an outlet zone above and below the heat exchange zone. They may be termed boundary means as they define boundaries between the heat exchange zone and the inlet and outlet zones.

In gas-heated reformers, the inlet for the feed gas mixture is typically located at the top end of the reformer. The feed gas mixture may be passed to distribution means, such as header pipes which distribute the feed gas mixture to the heat exchange tubes. The tubes pass through a heat exchange zone in which heat is transferred to the reactants passing through the tubes. Collector pipes may be connected to the bottom of the tubes and the reformed gas outlet which may be at the bottom end of the steam reformer. Alternatively tube-sheets may be provided to separate the inlet and outlet zones from the heat exchange zone. Thus a tube-sheet may separate the heat exchange zone through which the hot gas passes from a zone, such as a plenum chamber, communicating with the interior of the heat exchange tubes to permit feed of feed gas mixture to the tubes or off-take of reformed gas from the tubes. Alternatively there may be a combination of tube-sheets and header pipes. Alternatively, the heat exchange tubes may discharge the reformed gas into the heat exchange zone containing the hot gas to form a reformed gas mixture which is recovered from the reformed gas outlet. The reformed gas may be recovered from the top end or bottom end of the steam reformer. Again, the tube-sheets or header or collector may be termed boundary means as they define boundaries between the heat exchange zone and the inlet and outlet zones.

Preferably hot gas distribution means, such as baffles, are provided within the reformer that causes the hot gas to flow evenly through the reformer.

The heat exchange tubes may have a circular cross section and may have a length of 5 to 15 m and preferably a diameter in the range 5 to 30 cm. In operation, the heat-exchange tubes are heated to a high temperature, typically to a temperature in the range 650° C. to ≥900° C. This heating necessarily means that the tubes are subject to thermal expansion; both longitudinally and radially, as the tubes are heated from ambient temperature to the operating temperature, and likewise to thermal contraction as the tube is cooled upon shut down of the process. Because the heat-exchange tubes are often of considerable length, the tubes can expand longitudinally by an amount, often 10 cm or more, relative to the casing to which the boundary means is fastened. Thus preferably the heat-exchange tubes are moveably attached to at least one of the boundary means. By the term "moveably attached" we mean that the tube is attached to the boundary means by means that allow for the thermal expansion and contraction of the heat-exchange tubes. Normal practice is to provide flexible elements known as "pigtails" at one or both ends of the tubes to permit such differential expansion so that the pigtails, rather than the tubes themselves are fastened to boundary means. Alternatively, bellows arrangements may be employed to permit such expansion. Preferably, in gas heated reformers, venturi-seal designs as described in EP-B-0843590 may be employed. The heat-exchange tubes are preferably moveably attached to one boundary means and non-moveably attached to the other. Thus the heat-exchange tubes preferably extend from a first boundary means to which they are non-moveably attached, through the heat exchange zone, and are moveably attached by means of e.g. pigtails, bellows or venturi seal tubes, to a second boundary means.

The tubes contain a particulate steam reforming catalyst adjacent the tube outlet and a structured steam reforming catalyst adjacent the tube inlet. Thus the tubes typically contain a particulate steam reforming catalyst in the lower part of the tubes and a structured steam reforming catalyst in the upper part of the tubes.

The particulate steam reforming catalyst may be in the form of shaped units, e.g. cylinders, rings, saddles, and cylinders having a plurality of through holes, and are typically formed from a refractory support material e.g. alumina, ceria, calcium aluminate cement, magnesium aluminate, magnesia or zirconia impregnated with a suitable catalytically active metal such as nickel. We have found that improved catalyst performance at low steam ratios may be achieved where at least a portion of the catalyst includes a precious metal, such as ruthenium. Also, preferably the particulate catalyst is in the form of lobed or fluted cylinders having a passage, or preferably more than one passage, extending longitudinally there through as this has been found to offer high catalyst activity combined with low pressure drop through the tubes. The particle size of the particulate catalysts is typically such that the width or diameter of the particles is in the range 3-50 mm, preferably 5-25 mm. The particulate catalysts are preferably cylindrical pellets with one or more through holes, particularly 4-10-holed cylinders, with a diameter in the range 3-50 mm, preferably 5-25 mm, and a length/diameter ratio in the range 0.5-2.0. Particularly suitable catalysts are described in WO2010/029323 and WO2010/029324. One or more particulate catalysts may be provided as a mixture or as layers within the tube. The particulate steam reforming catalyst is prevented from falling out of the tubes by a perforated mesh or grill suitably fixed at the bottom of the tubes.

The structured steam reforming catalyst may be a steam reforming catalyst supported on a structure. Such structured catalysts are known and include metal or ceramic structures comprising a plurality of passages through which a process fluid may pass in ordered, non-random directions. The structures are generally coated with a layer of steam reforming catalyst, which may conveniently be applied as a washcoat. The steam reforming catalyst may comprise nickel or a precious metal, such as platinum, or ruthenium or a mixture thereof on a refractory oxide such as alumina or magnesia, including mixed oxides with ceria, zirconia or lanthana. The structures on which the catalyst is supported may be in the form of one or more cylindrical units with a diameter complimentary to the tubes in which they are placed. By the term "complimentary", the diameter of the cylindrical units may be 1-20 mm less than the internal diameter of the tube in which they are placed so that they fit neatly within the tube. The cylindrical units may comprise perforations and/or folded leafs and/or tabs that cause process fluid to flow both axially and radially as it passes through the units. The cylindrical units are preferably stackable such that they may be readily loaded upon each other so that they are self-supported within the tubes. One or more steam reforming catalyst-coated structured catalysts may be included in the tubes. Preferred steam reforming catalyst-coated structured catalysts are described in US2012/0195801 A1. These structured catalysts comprise a fan in the form of a corrugated disk arranged on a central rod. The fan has radial fluid ducts that radially guide the fluid flow to contact the inside wall of the tube; the fan having a top surface, a bottom surface and an outer diameter face such that the radial fluid ducts terminate along the outer diameter face of the fan to form fluid duct openings facing the inside wall of the tube, the fan further having a flat or corrugated washer in contact with the top surface or the bottom surface of the fan, where the washer may be in the shape of a ring having an inner diameter and an outer diameter, the washer being in contact with the top surface or the bottom surface of the fan so that the outer diameter of the washer extends radially outward from the outer diameter face of the fan. The washer may further have spacing tabs extending outward from the outer diameter of the washer that separate it from the inside wall of the tube such that the washer creates a gap between the outer diameter face of the fan and the reactor tube. Alternative structured catalyst arrangements on which the steam reforming catalyst may be supported include those described in US2012/0294779, US2012/0288420, U.S. Pat. Nos. 8,257,658, 8,235,361, 7,976,783, 7,566,487, 7,761, 994, 8,178,075 and U.S. Pat. No. 7,871,579.

The structured steam reforming catalyst may, alternatively, be a steam reforming catalyst contained within a structure. The structure in which the steam reforming catalyst may be contained preferably comprises discrete catalyst containers, cups or cans containing a catalyst. Such catalyst containers are known and include passages or paths through which a process fluid may pass in ordered, non-random directions. The catalyst containers may be in the form of cylindrical units with a diameter complimentary to the tubes in which they are placed. By the term "complimentary", the diameter of the catalyst container structures may be 1-20 mm less than the internal diameter of the tube in which they are placed so that they fit neatly within the tube. The catalyst containers may include perforations and/or tubes and/or vanes and/or fins that cause the process fluid to flow both axially and radially as it passes through the units. The cylindrical units are preferably stackable such that they may be readily loaded upon each other so that they are self-supported within the tubes. The catalyst in this case may be in the form of catalyst particles such as pellets, granules or extrudates, catalysed metal or ceramic foams or catalysed metal or ceramic honeycomb structures. Whereas the catalyst composition of the particulate catalyst and the structured catalyst may be the same, preferably the particulate catalyst comprises nickel and optionally one or more precious metals and the structured catalyst comprises one or more precious metals. One or more steam reforming catalysts and/or one or more types of catalyst container may be included in the tubes. Preferred steam reforming catalyst-containing structured catalysts are described in US2011/0194991 A1. These structured catalysts comprise a series of catalyst cups stacked one on top of the other where the catalyst cups have an open top, a closed bottom and a series of perforations in the side wall for directing fluid flow through the reactor, the fluid ducts being effective to radially guide the fluid flow to contact the inside wall of the tube; the cups containing a particulate catalyst. The cups may further have a sealing mechanism to minimise the flow passing through the gas between the upper outer edge of the cup and the inside of the tube wall. Alternative steam reforming catalyst-containing structured catalysts that may be used include those described in US2012277331.

In the present invention, with a feed gas inlet at the top of the steam reformer, the structured steam reforming catalyst is located in the tubes above the particulate steam reforming catalyst. The structured steam reforming catalyst or catalysts may be placed directly on the particulate steam reforming catalyst, or may be supported upon an intermediate support device placed between the catalysts. If the structured catalyst is supported on a central rod then an intermediate structure or grid is desirable to avoid point loads on the particulate catalyst. If the structured steam reforming catalyst is in the form of a catalyst container where the diameter of the container is a substantial fraction of the inside diameter of the tube and has a load bearing base then the intermediate support device can be omitted.

The structured steam reforming catalyst are preferably free to move up and down within the tube as during operation of particulate steam reforming catalysts such catalysts slowly settle and the height of the top of the catalyst gradually reduces with time. If the structured steam reforming catalyst remained locked in position during operation then a gap may develop between the bottom of the structured catalyst and the top of the particulate catalyst. Such a gap would have poor heat transfer and would not catalyse the endothermic reaction, resulting in a higher than normal tube temperature at that point.

The tubes contain a particulate steam reforming catalyst adjacent the tube outlets and a structured catalyst adjacent the tube inlets. The proportion of structured catalyst to particulate catalyst within the tubes is preferably in the range 1:9 to 9:1, more preferably 1:3 to 2:1.

Desirably all of the tubes contain the same proportions of structured catalyst and particulate catalyst, although this is not essential. This provides the benefits of the higher activity, higher heat transfer and low pressure drop of the structured catalyst at the inlet end and the benefit of the cheaper and stronger particulate catalyst at the outlet end.

The invention further includes a process for steam reforming of hydrocarbons comprising the steps of (i) passing a feed gas mixture, comprising hydrocarbon and steam through a plurality of externally-heated vertical tubes disposed within a steam reformer, and (ii) recovering a reformed gas mixture from the tubes, wherein each tube has an inlet for the feed gas mixture, an outlet for the reformed gas mixture, and the tubes contain a particulate steam reforming catalyst adjacent the outlet and a structured steam reforming catalyst adjacent the inlet, so that the feed gas mixture contacts the structured steam reforming catalyst and then the particulate steam reforming catalyst.

The hydrocarbon feedstock may be methane, natural gas or naphtha, and is preferably a natural gas containing a high (i.e. >90%) methane content. Prior to reforming the hydrocarbon feedstock is preferably desulphurised e.g. by passing the hydrocarbon though a bed of a suitable sulphur compound absorbent such as zinc oxide.

During the reforming process, methane reacts with steam to produce hydrogen and carbon oxides. Any hydrocarbons containing two or more carbon atoms that are present are converted to methane, carbon monoxide and hydrogen. In addition, the reversible water-gas shift reactions occur.

Steam reforming reactions take place in the tubes over the steam reforming catalysts at temperatures above 350° C. and typically the process fluid exiting the tubes is at a temperature in the range 650-950° C. The hot gas flowing around the outside of the tubes may have a temperature in the range 500-2000° C.

The inlet mass rate, G, to a tubular reactor is defined as the mass flow rate, w (for example having units of kg/s) at the inlet end divided by the cross-sectional flow area, A, of the tube (for example having units of $m^2$), i.e. G=w/A. As disclosed in Perry's Chemical Engineers Handbook, 6th Ed. pp. 18-24 through 18-27, use of the term G/Φ permits comparison of other gases with air, where Φ is the square root of ($\rho_g/\rho_{air}$), and where $\rho_g$ is the density of the gas of interest and $\rho_{air}$ is the density of air. For the purposes of this disclosure, $\rho_g$ is the density of the feed gas mixture at the inlet of the steam reformer in units of kg/$m^3$ and $\rho_{air}$ is 1.2 kg/$m^3$. The term G/Φ is herein called the density modified inlet mass rate. The feed gas mixture may be introduced with a density modified inlet mass rate of 5.7 kg/$m^2$ s to 30 kg/$m^2$ s, or 7 kg/$m^2$ s to 30 kg/$m^2$ s, or 8 kg/$m^2$ s to 30 kg/$m^2$ s. It may not be desirable to operate a reformer having conventional pelleted catalyst throughout the length of the tubes at these high density modified mass rates due to high pressure drop thereby requiring high compression energy.

The pressure drop through the structured catalyst may be 5000 Pa to 50,000 Pa per meter length of structured catalyst.

The apparatus and process of the present invention may be used as part of a process for the manufacture of hydrogen, methanol, dimethyl ether, olefins, ammonia, urea or hydrocarbon liquids, e.g. diesel fuels, obtained by the Fischer-Tropsch synthesis. Thus the reformed gas mixture obtained using the apparatus or in the process of the present invention may be subjected to further process steps including a step of hydrogen separation, methanol synthesis, dimethyl ether synthesis, olefin synthesis, ammonia synthesis, or hydrocarbon liquid synthesis. Known processes may be used to accomplish these steps.

The invention is further illustrated by reference to FIGS. 1-3, in which.

Figure 1:
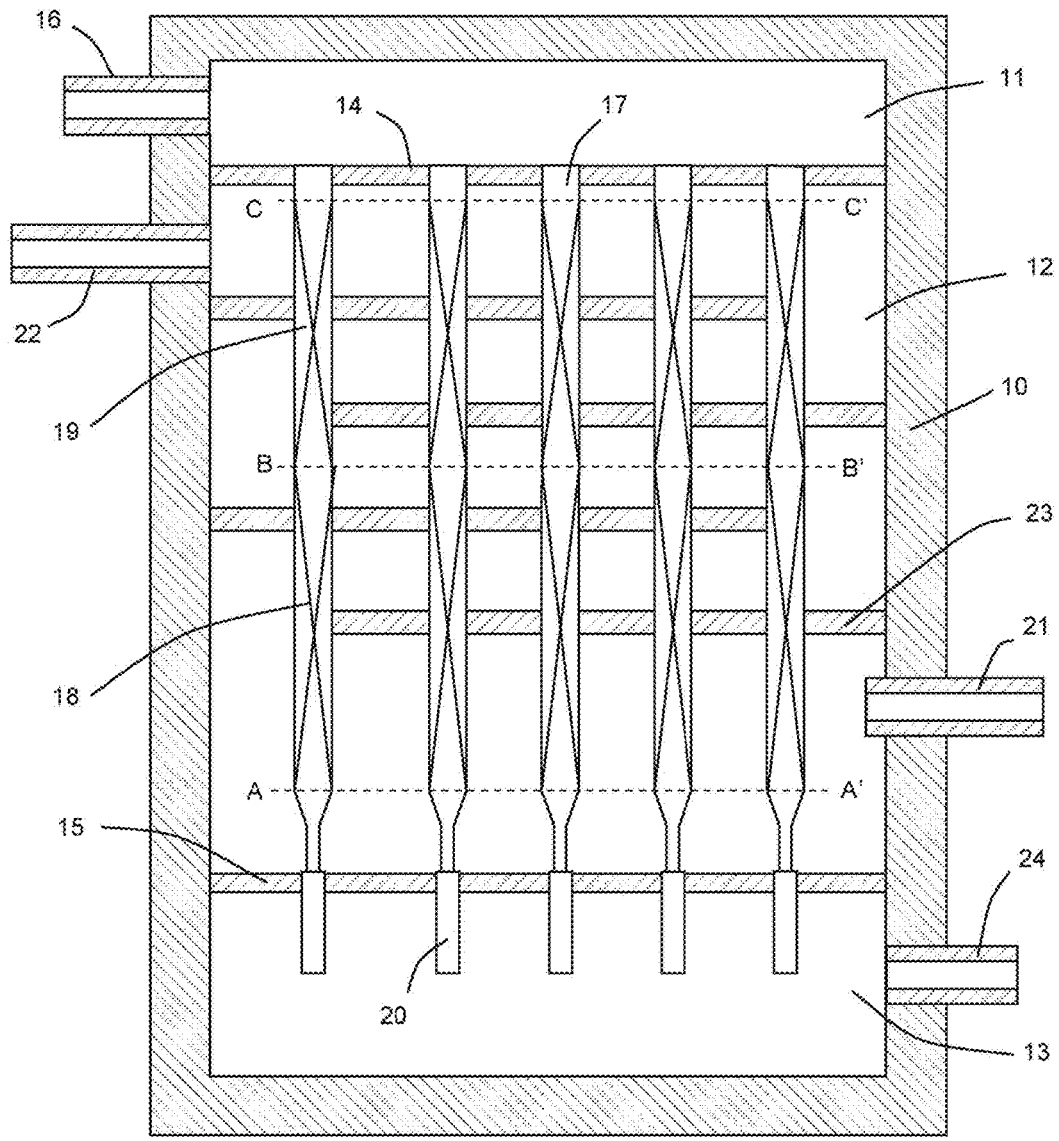
FIG. 1 is a depiction of a gas-heated steam reformer having a plurality of externally-heated tubes containing a structured a catalyst and a particulate catalyst according to the invention.

In FIG. 1 there is shown a gas heated reformer (GHR) having an outer insulated pressure shell 10 enclosing three zones 11, 12, 13, defined by the shell wall and tube sheets 14 and 15. Zone 11, a process fluid feed zone, is defined by the shell wall and tube sheet 14. It is provided with a process fluid supply conduit 16 and has a plurality of vertical heat exchange tubes, 17 fastened to, and extending downwards from, tube sheet 14. The number of tubes employed will depend on the scale of operation: although only five tubes are shown, there may be typically be 50 or more such tubes. For steam reforming, the tubes 17 will be filled from a position near the outlet of the tubes to an intermediate position (A-A' to B-B') with a suitable particulate steam reforming catalyst 18, for example multi-holed cylinders of a refractory oxide-supported nickel catalyst according to WO2010/029323 or WO2010/029324, and from the intermediate position to the inlet of the tubes (B-B' to C-C') with a structured catalyst 19, for example a corrugated fan structured catalyst according to US2012/0195801. An intermediate support device is placed between the particulate catalyst and structured catalyst (not shown). Zone 12, a heat exchange zone, is defined by the shell wall and tube sheets 14 and 15. The heat exchange tubes 17 extend through the heat exchange zone 12 and are moveably attached by venturi seals 20 to the tube sheet 15. The heat exchange zone 12 is fed with a heating medium, e.g. hot gases, via a conduit 21 positioned in the shell 10 near the bottom of the tubes 17. The heating medium passes upward in the heat exchange zone where it exchanges heat with the tubes 17 and is then removed via a conduit 22 positioned in the shell 10 near the top of the tubes 17. The transverse baffles 23 act to divert the heating medium horizontally across the reformer and enhance its heat exchange with the tubes. Zone 13, the process fluid off-take zone, is defined by the wall of shell 10 and the tube sheet 15. The venturi seals 20 are open-ended and extend below the tube sheet 15 into the off-take zone 13. The reformed gases pass from the tubes 17 through the venturi seals 20 and into the off-take zone 13 from which they are removed by a process fluid off-take conduit 24. In use, a process fluid comprising hydrocarbon and steam is fed at elevated temperature and pressure through the conduit 16 to the process fluid feed zone 11 and thence downward through the catalyst-filled tubes 17, contacting first with the structured catalyst 19 and then the particulate catalyst 18. Heat is exchanged with heating medium in the heat exchange zone 12 and reforming reactions take place. The gases undergoing reforming pass through the tubes 17 and thence though venturi seals 20 to the off-take zone 13 from which they are removed by the off-take conduit 24.

Figure 2:
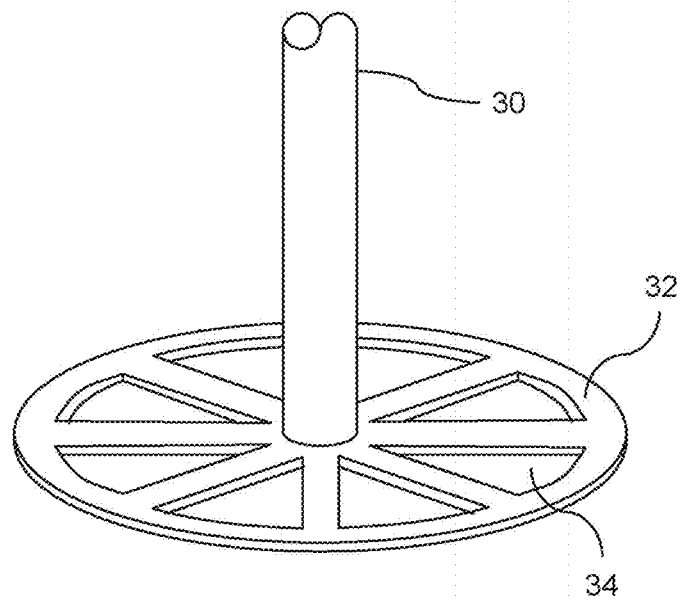
FIG. 2 depicts one embodiment of an intermediate support device which may be placed between the structured catalyst and the particulate catalyst.
Figure 3:
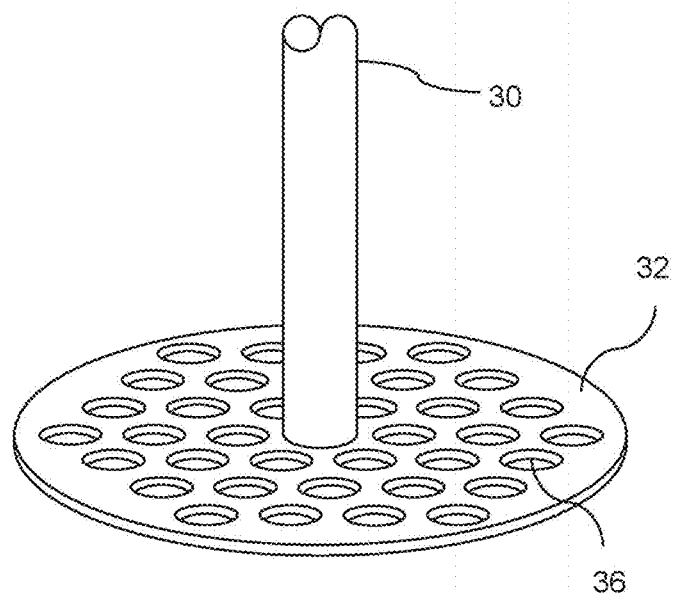
FIG. 3 depicts a further embodiment of an intermediate support device which may be placed between the structured catalyst and the particulate catalyst.

FIGS. 2 and 3 depict structured catalyst support devices that may be used to spread the weight of the structured catalyst over a larger area of the particulate catalyst to reduce breakage. In both figures, the structured catalyst is supported on a support member in the form of a central rod, 30. The bottom of the support member is attached to a base plate, 32 which may take the form of a disc or other shape suitable for insertion into a tube, such as a polygon. The base plate is perpendicular to the support member and therefore the tube when in use. The base plate 32 is perforated with a plurality of perforations to allow the through flow of the process gas between the structured catalyst and the particulate catalyst. These perforations may take the form of radially-extending triangles, 34 as in FIG. 2 or circles, 36 as in FIG. 3. Other shapes of perforation may be used.

The invention is further illustrated with reference to the following calculated example.

EXAMPLE 1

A top-fired steam reformer has 100 tubes, 127 mm inside diameter, 151 mm outside diameter and 12.0 m long in the heated length. This processes 500 kmol/hr of natural gas with a composition of 95.7% $CH_4$, 4.0% $C_2H_8$, 0.2% $C_3H_8$ and 0.1% $C_4H_{10}$ at a steam ratio of 3.0 with an additional feed of 20 kmol/hr of pure hydrogen. The reformer has a feed temperature of 550° C. and an outlet temperature necessary to give a methane slip of 2.7 mol % dry at a pressure of 21 barg. The inlet pressure is set by the catalyst pressure drop. The tubes are heated by combustion of natural gas of the same composition as the feed gas with 10% excess combustion air at 350° C. The particulate catalyst is Katal-co$_{JM}$™ 57-4, comprising 16% NiO on a calcium eliminate support in the form of cylindrical 4-hole pellets 17 mm long, 14 mm diameter with four 4 mm holes parallel to the axis of the cylinder. The structured catalyst is based on a Fecralloy foil cylindrical structure described in US2012/0195801A1, coated with an alumina based wash-coat comprising 16% NiO.

The performance of the reformer is simulated for 3 catalyst cases. Case 1 is comparative and has a particulate catalyst through the entire length of the tube. Case 2 is comparative and has a structured catalyst based on a coated structured packing through the entire length of the reformer tube. The structured catalyst exhibits 30% higher heat transfer, 50% higher GSA (hence activity) and 10% lower pressure drop than the particulate catalyst. The structured catalyst in Case 2 needs to have a more extensive load bearing support structure in the catalyst in the bottom 60% of the tube. Case 3 is according to the invention and is based on a split of catalysts types with the upper 40% of the tube filled with the upper structured catalyst of Case 2 and the lower 60% of the tube filled with particulate catalyst from Case 1. The performance of each catalyst type is modelled with fresh catalyst at the start of run (SOR) and with aged catalyst at the end of run (EOR) when carbon formation is predicted to occur. The age of the catalysts is different for the different end of run cases. A table of key conditions is included below.

However, by replacing the most expensive catalyst in the bottom of the tube where the higher temperature, reduced strength and higher load have required a more expensive support structure with particulate catalyst, the doubling of the catalyst life is still achieved at an overall lower annualised catalyst cost.

The invention claimed is:
1. An apparatus for steam reforming hydrocarbons, comprising a steam reformer having an inlet through which a feed gas mixture may pass and an outlet through which a reformed gas mixture may pass, the steam reformer containing a plurality of externally-heated vertical tubes each tube having:
 a tube inlet for a feed gas mixture comprising hydrocarbon and steam, and
 a tube outlet for a reformed gas mixture,
wherein:
 the steam reformer inlet is in fluid communication with the tube inlets and the steam reformer outlet is in fluid communication with the tube outlet; and
 the plurality of externally-heated vertical tubes each contain a particulate steam reforming catalyst comprising nickel on a refractory oxide adjacent the tube outlet and a structured steam reforming catalyst comprising nickel on a refractory oxide adjacent the tube inlet, and
 the structured steam reforming catalyst is a steam reforming catalyst (a) supported on a metal or ceramic support structure wash-coated with a layer of steam reforming catalyst, said support structure comprising a plurality of passages through which a process fluid may pass in ordered, non-random directions or is a steam reforming catalyst (b) contained within a containing support structure and comprises discrete catalyst containers, cups or cans that include passages through which a process fluid may pass in ordered, non-random directions.

|  |  | Case |  |  |  |  |  |
|---|---|---|---|---|---|---|---|
|  |  | Case 1 | | Case 2 | | Case 3 | |
| Condition | — | SOR | EOR | SOR | EOR | SOR | EOR |
| Age | years | 0 | 4 | 0 | 8 | 0 | 8 |
| $CH_4$ slip | mol % dry | 2.70 | 2.70 | 2.70 | 2.70 | 2.70 | 2.70 |
| Exit temperature | ° C. | 888 | 889 | 888 | 889 | 888 | 891 |
| Pressure drop | bar | 1.17 | 1.42 | 1.05 | 1.23 | 1.13 | 1.52 |
| Max tube temperature | ° C. | 914 | 915 | 909 | 912 | 913 | 917 |
| Fuel flow | Kmol/hr | 257 | 258 | 256 | 257 | 257 | 259 |
| Relative catalyst cost | — | 1.0 | | 2.5 | | 1.4 | |
| Relative catalyst cost/year | — | 0.25 | | 0.3125 | | 0.175 | |

The table demonstrates how the change in the lower catalyst has very little impact on the key performance parameters for the reformer as the outlet conditions in a top-fired reformer set the maximum tube wall temperature, the outlet temperature and the fuel flow. However, a substantially better catalyst in the top of the tube has a significant impact on the performance allowing the catalyst to operate for 8 years instead of 4 years before carbon forming conditions are reached and the catalyst must be recharged. In this example therefore, as the structured catalyst is some 2 to 3 times more expensive than the particulate catalyst, a doubling of catalyst life leaves the annualised catalyst cost as being higher than the particulate catalyst.

2. The apparatus according to claim 1, wherein in the steam reformer,
 heat is transferred to the plurality of externally-heated vertical tubes by means of a hot gas flowing around the tubes in a heat exchange zone.
3. The apparatus according to claim 1, wherein the steam reformer is a top-fired steam reformer or a side-fired steam reformer, wherein the hot gas is provided by combusting a fuel gas using a plurality of burners disposed either at the top end or along the length of the plurality of externally-heated vertical tubes.
4. The apparatus according to claim 1, wherein the steam reformer is a gas-heated reformer (GHR), wherein the hot gas is provided by (i) a flue-gas from a combustion process, (ii) catalytic or non-catalytic partial oxidation of a hydrocarbon, or (iii) autothermal reforming of a hydrocarbon and/or the reformed gas mixture.

5. The apparatus according to claim 4, wherein the hot gas is mixed with the reformed gas after passing through the plurality of externally-heated vertical tubes.

6. The apparatus according to claim 1, wherein the particulate steam reforming catalyst is formed from a refractory support material impregnated with nickel.

7. The apparatus according to claim 1, wherein the particulate steam reforming catalyst comprises cylindrical pellets with one or more through holes, a diameter in the range of 3-50 mm and a length/diameter ratio in the range of 0.5-2.0.

8. The apparatus according to claim 1, wherein the support structure is a cylindrical unit with a diameter complementary to the externally-heated vertical tube in which it is placed and comprises perforations, folded leafs, tabs, or a combination thereof, wherein the process fluid is able to flow axially and radially through the cylindrical unit.

9. The apparatus according to claim 1, wherein the support structure is a cylindrical unit with a diameter complementary to the externally-heated vertical tube in which it is placed and comprises perforations, tubes, vanes, fins, or a combination thereof, wherein the process fluid flows axially and radially through the unit.

10. The apparatus according to claim 1, wherein the steam reforming catalyst contained in the containing support structure is in the form of particles, pellets, granules, or extrudates, a metal foam, a ceramic foam, a metal honeycomb structure, or a ceramic honeycomb structure.

11. The apparatus according to claim 8, wherein the cylindrical units are stackable and self-supported within the externally-heated vertical tubes.

12. The apparatus according to claim 1 wherein the structured catalyst is supported on an intermediate support device that sits on top of the particulate catalyst.

13. The apparatus according to claim 1 wherein the structured catalyst is configured such that it is free to move down the tube.

14. The apparatus according to claim 1, wherein proportion of structured catalyst to particulate catalyst is in the range of 1:9 to 9:1.

15. The apparatus according to claim 9, wherein the cylindrical units are stackable and self-supported within the tubes.

16. The apparatus according to claim 1, wherein the proportion of structured catalyst to particulate catalyst is in the range of 1:3 to 2:1.

17. A process for steam reforming hydrocarbons, comprising the steps of:
  (i) passing a feed gas mixture, comprising hydrocarbon and steam through the plurality of externally-heated vertical tubes disposed within the steam reformer of claim 1, and
  (ii) recovering a reformed gas mixture from the tubes.

18. The process according to claim 17, wherein the mixture fed to the catalyst-containing tubes has a density-modified inlet mass rate in the range of 5 to 30 kg/m$^2$s.

* * * * *